July 11, 1961 R. R. URSCH 2,992,405
INSULATING AND COOLING DEVICES
Filed March 26, 1957
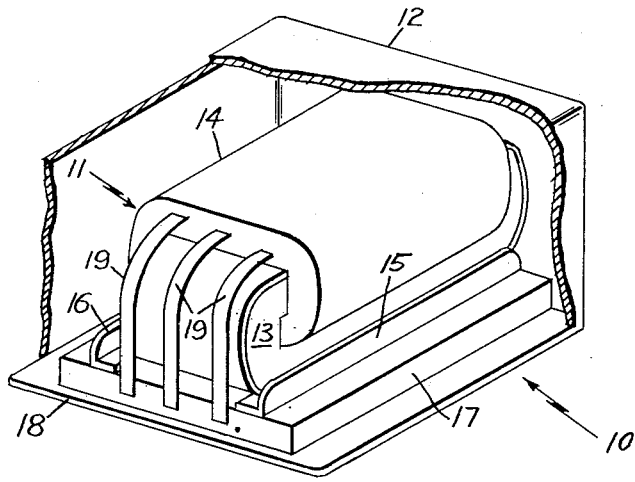
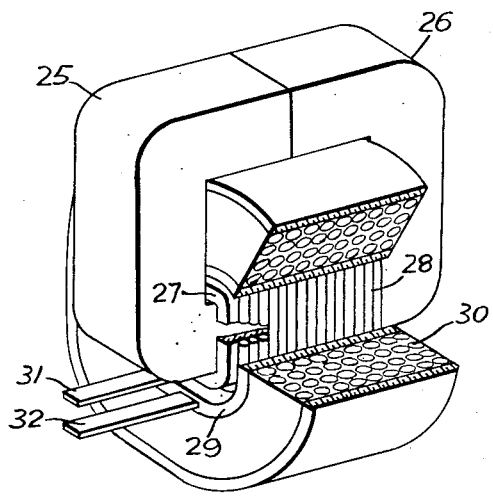
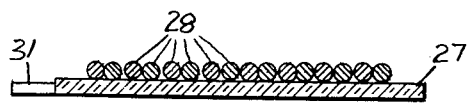
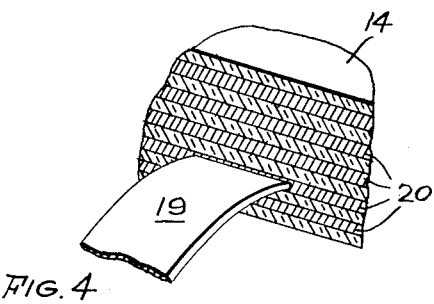
INVENTOR
RALPH R. URSCH
BY
ATTORNEY

United States Patent Office 2,992,405
Patented July 11, 1961

2,992,405
INSULATING AND COOLING DEVICES
Ralph R. Ursch, Littleton, Mass., assignor to Raytheon Company, a corporation of Delaware
Filed Mar. 26, 1957, Ser. No. 648,687
4 Claims. (Cl. 336—55)

This invention relates to an improved means for cooling an electrical apparatus, and more particularly, to the improvement of high temperature miniaturized magnetic components.

In this invention there is disclosed a heat-producing electrical apparatus and a cooling means for cooling said electrical apparatus, wherein said electrical apparatus operates at a high potential with respect to said cooling means, and where a ceramic means is connected intermediate said heat-producing electrical apparatus and said cooling means for electrically insulating and providing a high thermal conductivity path between said electrical apparatus and said cooling means.

In the present state of the art, cooling of reactive components such as transformers is accomplished by means of heat conductive elements such as copper shields, plates or tabs placed within the windings of the reactors or transformers and suitably insulated from all coil windings. The heat generated by the coil windings of such components is conducted via these defined heat-conductive elements to an externally located heat sink. For low voltage operation, and particularly at higher potentials, the insulation surrounding the coil members must have sufficient dielectric strength to insulate the defined heat conductors since the heat conductors are at the same potential as the cooling means which is usually at a substantially different potential from said coil members. The immediate disadvantage of adding the necessary dielectric material is the increase in weight of the completed electrical apparatus and also the decrease in cooling efficiency of the thermal conductors. This is readily apparent when it is considered that every additional barrier placed between the heat-generating source and the thermal conducting members increases the thermal barrier, and hence, decreases the cooling efficiency and with increasing tendencies toward the use of high operating potential to obtain the improved electrical efficiency and the requirement of reducing weight and size of the electrical apparatus, it has become apparent that present day techniques do not solve the problem.

This invention discloses a system whereby heat is conducted from the specific heat-generating portions of an electrical apparatus, such as the core and coil of a filter reactor, to a cooling means, such as a heat sink, even though the windings may be at a high potential with respect to said heat sink. In addition, there is disclosed a system for extracting heat from the electrical conductors directly at many different locations within said coil. These advantages are made possible by connecting a high density ceramic member, preferably high beryllia ceramic or high alumina ceramic or any other ceramic having similar high thermal conductivity and high dielectric strength intermediate the heat-producing electrical apparatus and cooling means. In addition, it now becomes possible to wind a coil with copper foil and bring out tabs fastened directly to the copper foil for direct attachment to a portion of the defined ceramic. This allows heat to be extracted directly from the heat-generating sources within the electrical apparatus. Substantial size reductions have been obtained by eliminating the high voltage insulation in the coil members and placing the insulation barrier between the core and ground in connection with the defined cooling techniques outlined above. The benefits to be derived from using a high density ceramic in places where good dielectric strength material is needed and also where good thermal conductivity is needed will be made more apparent by comparing typical thermal conductivity values of a high density ceramic, copper and a typical dielectric insulation.

High beryllia ceramic __ 1.7 to 3.9 watts/in.²/° C./in.
Copper _____ 9.7 watts/in.²/° C./in.
Typical dielectric insulations _____ .003 to .008 watt/in.²/° C./in.

On an equivalent weight basis, the thermal conductivity of high beryllia ceramic is from 0.5 to 1.3, that of cooper. It can be seen therefore, that since an electrical apparatus cooled by previously known techniques requires increased thickness of dielectric material for higher voltage designs, the thermal characteristics of the conducting members are decreased as operating voltage requirements increase since more dielectric materials must be placed intermediate the conductive members and the heat-generating coil members. In this invention, however, the thermal qualities do not change substantially over a wide range of operating voltages.

Further objects and advantages of the present invention will be made more apparaent as the description progresses, reference now being made to the accompanying drawings wherein:

FIG. 1 illustrates a transformer comprising a core member and coil members wherein said core member is connected directly to a high density ceramic member;

FIG. 2 illustrates a transformer wherein the coil members are insulated from each other and insulated from a core member by means of a high density ceramic bobbin member;

FIG. 3 illustrates how the coil members illustrated in FIG. 2 are placed in direct contact with the defined ceramic bobbin member; and FIG. 4 illustrates how the heat-conductive elements illustrated in FIG. 1 are electrically connected to foil members that comprise the complete coil.

Referring now to FIGS. 1 and 4, there is shown a complete transformer assembly 10 comprising a core and coil assembly 11 located within case 12, which case serves as a cooling means for dissipating the heat generated by said core and coil assembly 11. Core and coil assembly 11 consist of a core 13 and coil members 14 wound about said core. Core 13 is thermally connected to a pair of core-holding brackets 15 and 16 which brackets are also attached to a high density ceramic member 17 by means of a ceramic-to-metal seal between bracket members 15 and 16 and ceramic member 17. Ceramic member 17 is in turn attached to a portion of the outside case member 18 by means of another ceramic-to-metal seal between said ceramic member 17 and the bottom section of case member 18. The high density ceramic member 17 provides the electrical insulation between plate 18 and core member 13, and also provides the high thermal conductivity necessary to conduct the heat from said core material to said plate 18, which forms part of cover 12. The amount of heat conducted from core and coil assembly 11 is therefore a function of the contact area between core 13 and core brackets 15 and 16 which actually contact said core 13, and also the contact area of core brackets 15 and 16 contacting ceramic member 17. Increased contact area will therefore improve the conduction of heat from said core 13 to said ceramic member 17. The contact area between ceramic member 17 and plate 18 will then determine the amount of heat that can be fed to plate 18 and hence to cover 12, which is in thermal contact with plate 18. Improved cooling is also achieved by connecting copper heat tabs 19 directly from the coil members to ceramic member 17. These heat tabs 19 have a high thermal conductivity and can be placed in any manner and in any configuration depending only upon where the maximum heat is being generated. A coil wound with copper foil conductors 20 can be constructed with tabs fastened directly to the conductor and then taken out to the ceramic member 17 as shown in FIG. 4. A coil wound with wire conductors would use the more conventional method of bringing out tabs from copper shields placed within the windings themselves and then from these tabs to ceramic member 17.

Referring now to FIG. 2, there is shown another embodiment of this invention illustrating the use of a ceramic jacket or bobbin within the windings of a transformer. Contacting said cores 25 and 26 is a bobbin 27 constructed of a high density ceramic material. A primary winding 28 is wound on a ceramic bobbin 27 in the normal conventional manner, and covering primary winding 28 is a second ceramic bobbin member 29 upon which is wound a secondary or high voltage winding 30. Improved cooling of the defined transformer is achieved by means of copper tabs 31 and 32 which are connected to ceramic members 27 and 29, respectively. By using ceramic bobbin members 27 and 29, it is possible to connect copper tabs 31 and 32 directly to a cooling means such as that illustrated in FIG. 1 without fear of short circuiting the electrical apparatus. In addition, it is possible to attach as many copper tabs to the ceramic bobbin members as is necessary without affecting the electrical characteristics of the electrical apparatus, and further, since both the primary and secondary windings are insulated by means of ceramic bobbin 27, it is also possible to directly connect core members 25 and 26 to a cooling means without affecting the electrical characteristics of the apparatus.

FIG. 3 illustrates how windings 28 are directly connected to ceramic member 27 thereby gaining improved thermal characteristics between the heat-conducting portions of copper tab 31 and windings 28 which generates the heat to be conducted away.

This completes the description of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:
1. In combination, a heat-producing electrical apparatus, heat dissipation means for cooling said apparatus, a solid ceramic block, said apparatus being mounted on said ceramic block, and said ceramic block being attached to said heat dissipation means to provide electrical insulation and a high thermal conductivity path between said apparatus and said heat dissipation means.

2. In combination, a heat-producing electrical apparatus, heat dissipation means for cooling said apparatus, a solid ceramic block, said heat-producing apparatus being mounted on said solid ceramic block, a plurality of heat conducting tabs attached to internal portions of said apparatus and to said ceramic block, and said ceramic block being attached to said heat dissipation means to provide electrical insulation and a high thermal conductivity path between said apparatus and said heat dissipation means.

3. In combination, a heat-producing electrical apparatus having at least one coil wound thereon, heat dissipation means for cooling said apparatus, a solid ceramic block, said apparatus being mounted on said ceramic block, a plurality of tabs attached at one end to said coil and at the other end to said ceramic block, and said ceramic block being attached to said heat dissipation means to provide electrical insulation and a high thermal conductivity path between said apparatus and said heat dissipation means.

4. In combination, a heat-producing electrical transformer having a core with at least a primary and a secondary winding wound thereon, heat dissipation means for cooling said transformer, a solid ceramic block, said core being mounted on said block, a plurality of heat conducting tabs attached from said windings to said block, and said block attached to said heat dissipation means to provide electrical insulation and a high thermal conductivity path between said apparatus and said heat dissipation means.

References Cited in the file of this patent

UNITED STATES PATENTS

| | | |
|---|---|---|
| 1,935,885 | Meissner | Nov. 21, 1933 |
| 2,121,930 | Reichmann | June 28, 1938 |
| 2,354,159 | Venable | July 18, 1944 |
| 2,361,249 | Venable | Oct. 24, 1944 |
| 2,770,785 | Haagens | Nov. 13, 1956 |

UNITED STATES PATENT OFFICE
CERTIFICATE OF CORRECTION

Patent No. 2,992,405            July 11, 1961

Ralph R. Ursch

It is hereby certified that error appears in the above numbered patent requiring correction and that the said Letters Patent should read as corrected below.

Column 3, line 13, after "transformer." insert -- Fig. 2 illustrates a transformer comprising split cores 25 and 26. --.

Signed and sealed this 21st day of November 1961.

(SEAL)
Attest:

ERNEST W. SWIDER
Attesting Officer

DAVID L. LADD
Commissioner of Patents

USCOMM-DC